UNITED STATES PATENT OFFICE.

JAMES PARK, JR., OF PITTSBURG, AND GEORGE HAY, OF ALLEGHENY, PA.

IMPROVEMENT IN MANUFACTURE OF CRUCIBLES.

Specification forming part of Letters Patent No. 192,345, dated June 26, 1877; application filed January 9, 1877.

*To all whom it may concern:*

Be it known that we, JAMES PARK, Jr., of Pittsburg, and GEORGE HAY, of Allegheny city, in the county of Allegheny and State of Pennsylvania, have invented a new and useful Improvement in the Manufacture of Crucibles; and we do hereby declare the following to be a full, clear, and exact description thereof.

Our invention relates to the manufacture of crucibles and similar articles, composed in whole or in part of plumbago, and has for its object the protection of the surfaces of the articles during the burning or baking process.

Heretofore in burning or baking crucibles and like articles formed from plumbago, or from mixtures of plumbago, refractory clays, sand, and like material, the article has been either inclosed in seggars or placed in open kilns or furnaces, the heat applied and continued for from forty-eight to sixty hours, the kiln or furnace then allowed to cool off, and the crucibles removed. The kilns during the baking or burning are kept at a red heat, and the action of the atmosphere or oxygen at such a temperature is found to be injurious to the pot, probably owing to the oxidation of the exposed surface. Whether from oxidation or other cause, it is nevertheless a fact that crucibles exposed to the air during the burning or baking are found to be less able to resist the high heats necessary to melt steel, and there is also a considerable loss of the material of which the crucible is formed.

In carrying out our invention, we surround the crucible or other article during the time of burning or baking with any vaporous, gaseous, or solid substance which will prevent the access of air or free oxygen to the article, and as charcoal is the most available material we shall describe our process in connection therewith.

The kilns or furnaces, such as at present employed, are so modified by the construction of surrounding flues and division walls, as to form large retorts, as it were, or the usual converting-furnaces may be employed, if preferred. The crucibles or like articles are packed in said kilns or retorts, and surrounded by broken or powdered charcoal, after which the chambers are closed to prevent the combustion of the charcoal, and the burning or baking is conducted in the usual manner.

When the seggars are employed the charcoal or like substance is packed in the seggars and around the crucible, and in such cases no modification of the furnace is required.

In employing vapors or gases, such as nitrogen, and like non-supporters of combustion, a close retort should be employed for the reception of the crucibles.

Crucibles or like articles burned or baked in the manner specified, will be found unaltered in appearance, much stronger, and more durable than the ordinary crucible, and without loss or change of substance.

Having thus described our invention, what we claim, and desire to secure by Letters Patent, is—

In the manufacture of crucibles or like articles, composed in whole or in part of plumbago, inclosing the article in a closed receptacle, and enveloping it in a solid or gaseous substance, substantially as specified, which will prevent oxidation of the carbonaceous matter of the crucible during the baking or burning, in the manner set forth.

In testimony whereof we, the said JAMES PARK, Jr., and GEORGE HAY, have hereunto set our hands.

JAMES PARK, JR.
GEORGE HAY.

Witnesses:
JAMES I. KAY,
F. W. RITTER, Jr.